(12) United States Patent
Kim (10) Patent No.: US 12,257,904 B2
(45) Date of Patent: Mar. 25, 2025

(54) HYBRID DRIVING MODULE

(71) Applicant: VALEO KAPEC CO., LTD., Daegu (KR)

(72) Inventor: Jung-Woo Kim, Daegu (KR)

(73) Assignee: VALEO KAPEC CO., LTD., Daegu (KR)

( * ) Notice: Subject to any disclaimer, the term of this patent is extended or adjusted under 35 U.S.C. 154(b) by 0 days.

(21) Appl. No.: 18/259,478

(22) PCT Filed: Dec. 30, 2021

(86) PCT No.: PCT/KR2021/020243
§ 371 (c)(1),
(2) Date: Jun. 27, 2023

(87) PCT Pub. No.: WO2022/146065
PCT Pub. Date: Jul. 7, 2022

(65) Prior Publication Data
US 2024/0066972 A1    Feb. 29, 2024

(30) Foreign Application Priority Data

Dec. 31, 2020 (KR) .................. 10-2020-0189835
Nov. 29, 2021 (KR) .................. 10-2021-0167615

(51) Int. Cl.
*B60K 6/387* (2007.10)
*B60K 6/26* (2007.10)
(Continued)

(52) U.S. Cl.
CPC ............ *B60K 6/387* (2013.01); *B60K 6/26* (2013.01); *B60K 6/405* (2013.01); *F16D 13/72* (2013.01);
(Continued)

(58) Field of Classification Search
CPC ..... B60K 6/387; F16D 25/0638; F16D 13/72; F16D 13/74; F16D 25/10; H02K 7/006; H02K 7/10
See application file for complete search history.

(56) References Cited

U.S. PATENT DOCUMENTS 9,303,747 B2    4/2016    Mototsune et al.
9,309,956 B2    4/2016    Lindemann et al.
(Continued)

FOREIGN PATENT DOCUMENTS

CN      101153635 A  *  4/2008    ............ F16D 21/06
EP      2998603 A1   *  3/2016    ........... F16D 13/385
(Continued)

OTHER PUBLICATIONS

International Search Report issued Apr. 11, 2022 in PCT/KR2021/020243 filed on Dec. 30, 2021 citing documents 1-11 & 15-17 therein 2 pages.
(Continued)

*Primary Examiner* — Stacey A Fluhart
(74) *Attorney, Agent, or Firm* — Oblon, McClelland, Maier & Neustadt, L.L.P.

(57) ABSTRACT

The present invention relates to a hybrid drive module, which may ensure pressing pressure for a lock-up clutch while reducing, through a simple structure, operating pressure of a piston for pressing a lock-up clutch disposed in a space to which fluid pressure of a torque converter is applied, the hybrid drive module having a small number of components and being capable of being easily assembled. The present invention is accomplished by providing a compensation chamber of the piston and filling the compensation chamber with a low-pressure fluid. In addition, the low-pressure fluid may be used as a fluid for lubricating and cooling an engine clutch.

14 Claims, 5 Drawing Sheets

(51) Int. Cl.
    *B60K 6/405*     (2007.10)
    *F16D 13/72*     (2006.01)
    *F16D 25/0638*     (2006.01)
    *H02K 7/00*     (2006.01)
    *H02K 7/10*     (2006.01)

(52) U.S. Cl.
    CPC ......... *F16D 25/0638* (2013.01); *H02K 7/006* (2013.01); *H02K 7/10* (2013.01); *B60Y 2200/92* (2013.01); *B60Y 2400/424* (2013.01); *B60Y 2400/426* (2013.01)

(56) References Cited

U.S. PATENT DOCUMENTS

| | | |
|---|---|---|
| 9,494,221 B2 | 11/2016 | Lindemann et al. |
| 9,810,302 B2 | 11/2017 | Sayre et al. |
| 10,704,614 B2 | 7/2020 | Iizuka |
| 11,121,605 B2 | 9/2021 | Vanni et al. |
| 2005/0133328 A1 | 6/2005 | Masuya |
| 2008/0072586 A1 | 3/2008 | Hammond et al. |
| 2013/0056319 A1 | 3/2013 | Lindemann et al. |
| 2015/0008086 A1 | 1/2015 | Mototsune et al. |
| 2016/0017971 A1 | 1/2016 | Sayre et al. |
| 2016/0178042 A1 | 6/2016 | Lindemann et al. |
| 2018/0313409 A1 | 11/2018 | Iizuka |
| 2019/0309806 A1 * | 10/2019 | Oyabu .................. F16D 25/082 |
| 2020/0039496 A1 | 2/2020 | Lindemann et al. |
| 2022/0219524 A1 * | 7/2022 | Binder .................. B60K 6/387 |
| 2022/0242216 A1 * | 8/2022 | Morita ................ F16D 25/0638 |

FOREIGN PATENT DOCUMENTS

| | | | |
|---|---|---|---|
| JP | 2013-217452 A | 10/2013 | |
| JP | 2018-184136 A | 11/2018 | |
| JP | 10-2020-0029506 A | 3/2020 | |
| KR | 10-2021-0029141 A | 3/2021 | |
| WO | WO-2004104439 A1 * | 12/2004 | ............. F16D 21/06 |

OTHER PUBLICATIONS

Extended European Search Report issued Mar. 19, 2024, in corresponding European Patent Application No. 21915862.3 citing documents 1-3 therein, 7 pages.

Office Action issued Jun. 25, 2024, in corresponding Korean Patent Application No. 10-2021-0167615, 6 pages.

* cited by examiner

HYBRID DRIVING MODULE

TECHNICAL FIELD

The present invention relates to a hybrid drive module, and more particularly, to a hybrid drive module, which is capable of reducing, through a simple structure, operating pressure of a lock-up clutch disposed in a space to which fluid pressure of a torque converter is applied, the hybrid drive module having a small number of components and being capable of being easily assembled.

BACKGROUND ART

A drive module used for a hybrid vehicle has a structure configured to transmit a force of a motor and a force of an engine to a transmission. A hybrid drive module includes an input member configured to receive the force of the engine, a motor, an engine clutch configured to connect the input member and the motor, an output member configured to receive the force of the motor and/or the engine and transmit the force to the transmission, and a power transmission part configured to connect the motor and the output member. The power transmission part may be structured to directly connect the motor and the output member or structured to include a torque converter and a lock-up clutch.

The motor may include a stator and a rotor, and the rotor may be installed on a rotor hub. A space in which the clutch and the like are installed is provided in a radial internal space of the rotor defined by the rotor hub. After the clutch and the like are installed in the space, a cover or a hub ridge is installed to cover the space. The hub ridge is installed to rotate integrally with the rotor hub.

The stator is installed in a housing. Further, the input member, the rotor hub, the output member, and the like, which may rotate relative to one another, are installed to be rotatable relative to the housing.

The torque converter and the lock-up clutch, which are included in the power transmission part and connected in parallel between the motor and the output member, are accommodated in a space filled with a fluid for operating the torque converter. Further, a piston plate, which serves to press or release the lock-up clutch, is also accommodated in the space.

Typically, fluid pressure in the space is greatly increased by an operational principle of the torque converter. Therefore, pressure in an operation chamber of the piston plate installed to press the piston plate toward the lock-up clutch needs to be higher than pressure of the fluid in the space. For example, in case that the pressure in the space is about 4 bar, the pressure of the operation chamber needs to be about 11 bar so that torque applied to the lock-up clutch may be about 7 bar.

That is, pressure around the piston plate, which is disposed in the space in which the piston plate for pressing the lock-up clutch is installed, may be referred to as pressure in the compensation chamber of the piston plate. In case that the pressure in the compensation chamber is formed by the fluid for operating the torque converter, the pressure, which needs to be applied to the operation chamber to that extent, needs to be high. For this reason, there is a problem in that fuel economy inevitably deteriorates.

DISCLOSURE

Technical Problem

The present invention has been made in an effort to solve the above-mentioned problem, and an object of the present invention is to provide a hybrid drive module, which is capable of ensuring sufficient pressure to be applied to a lock-up clutch even though pressure in an operation chamber in which a piston plate presses a lock-up clutch is set to be low under a condition of fluid pressure in a space in which a torque converter (fluid clutch) is embedded.

Another object of the present invention is to provide a hybrid drive module that may be simply assembled and minimize an increase in number of components.

Technical Solution

The present invention may be applied to a hybrid drive module disposed between an engine and a transmission of a power system and having a motor configured to provide power to the transmission.

The motor may have a stator and a rotor.

The hybrid drive module may include a housing in which the stator is fixed, and a rotor hub disposed in the housing so that the rotor of the motor is installed on the rotor hub.

A power the transmission part may be connected to the rotor hub.

The power transmission part may include a fluid clutch connected to the rotor hub, and a first clutch pack connected to the rotor hub.

The fluid clutch may be a torque converter. That is, the fluid clutch may include an impeller and a turbine facing each other and having a half toms shape, and a reactor disposed between the impeller and the turbine and connected to a fixed end through a one-way clutch.

The rotor hub has a first accommodation space configured to accommodate the fluid clutch and the first clutch pack. The first accommodation space is filled with a fluid for operating the fluid clutch and cooling the first clutch pack.

A first piston plate configured to press or release the first clutch pack is installed in the first accommodation space.

The first piston plate has a shape extending in the radial direction and has a first surface directed toward any one side in the axial direction, and a second surface directed toward a side opposite to one side. That is, the first surface and the second surface are opposite to (face away from) each other.

Therefore, the first surface faces the first compensation chamber filled with the fluid with the pressure lower than the pressure of the fluid in the first accommodation space. As the first compensation chamber is provided as described above, it is possible to further reduce operating pressure for operating the first piston plate in comparison with a case in which the first compensation chamber is not present.

The second surface faces the first operation chamber filled with the fluid with the pressure for moving the first piston plate to the first clutch pack. The presence of the first compensation chamber may reduce the pressure of the fluid stored in the first operation chamber.

The first compensation chamber may be disposed between the rotor hub and the first piston plate in the axial direction.

The first compensation chamber may be defined by the first surface and a first guide cylinder disposed to face the first surface in the axial direction.

The first guide cylinder may be connected to the rotor hub.

In this case, a radial inner end of the first guide cylinder may be connected to the rotor hub at a side positioned radially inward of the first clutch pack.

A first return spring may be installed in the first compensation chamber. The first return spring provides elasticity in the axial direction. One side of the first return spring may be supported by the first guide cylinder, and the other side of the first return spring may be supported by the first piston plate. That is, the first return spring may elastically press the first piston plate in a direction in which the first piston plate moves away from the first guide cylinder in the axial direction.

The first piston plate may be disposed between the rotor hub and the first operation chamber in the axial direction.

The first operation chamber may be defined by the second surface and a support cylinder disposed to face the second surface in the axial direction.

The support cylinder may be connected to the rotor hub.

In this case, a radial inner end of the support cylinder may be connected to the rotor hub at a side positioned radially inward of the first clutch pack.

The rotor hub may have a rotor holder extending in the axial direction so that the rotor is fixed to the rotor holder, and a hub plate extending from the rotor holder to the radial inner side.

The hub plate may extend in the radial direction while traversing an internal space of the hybrid drive module and divide the internal space of the hybrid drive module into the first accommodation space and the second accommodation space in the axial direction.

The first piston plate may be disposed so that the first surface faces the hub plate.

A second clutch pack may be accommodated in the second accommodation space. The fluid for cooling the second clutch pack may fill the second accommodation space and flow.

The fluid in the second accommodation space may fill the first compensation chamber through the rotor hub. With the above-mentioned configuration, the first compensation chamber may be filled with the fluid with pressure lower than pressure in the first accommodation space only by simply supplying the fluid in the second accommodation space to the first compensation chamber through the first compensation hole provided in the rotor hub without adding a separate flow path or component.

A second piston plate configured to press or release the second clutch pack may be installed in the second accommodation space.

The second piston plate may have a third surface facing the second clutch pack in the axial direction, and a fourth surface opposite to the third surface in the axial direction.

The third surface may face a second compensation chamber filled with the fluid in the second accommodation space.

The fourth surface may face a second operation chamber filled with the fluid that generates pressure for moving the second piston plate toward the second clutch pack.

A hub ridge is connected to a front side of the rotor holder, and the second piston plate may be slidably installed on the hub ridge in the axial direction.

The hub ridge and the fourth surface may define the second operation chamber.

A second guide cylinder may be connected to the hub ridge, and the second piston plate may be disposed between the hub ridge and the second guide cylinder in the axial direction.

The third surface and the second guide cylinder may define the second compensation chamber.

A second return spring may be installed in the second compensation chamber. The second return spring provides elasticity in the axial direction. One side of the second return spring may be supported by the second guide cylinder, and the other side of the second return spring may be supported by the second piston plate. That is, the second return spring may elastically press the second piston plate in a direction in which the second piston plate moves away from the second guide cylinder in the axial direction.

The hybrid drive module may have an output member configured to transmit an output of the motor or the engine to the transmission.

The rotor hub may be connected to the first clutch pack at a radial inner side of the first clutch pack. The output member may be connected to the first clutch pack at a radial outer side of the first clutch pack. Therefore, it is possible to further simplify the structure and method of assembling the first compensation chamber, the first operation chamber, and the first piston plate.

The impeller may be connected to the rotor hub, and the turbine may be connected to the output member.

The output member may be connected to the first clutch pack through the turbine. The first clutch pack may constitute the lock-up clutch configured to directly couple or decouple the rotor hub and the output member.

The second clutch pack may constitute the engine clutch configured to connect or disconnect the engine and the rotor hub.

Advantageous Effects

According to the hybrid drive module of the present invention, it is possible to reduce the pressure in the operation chamber of the piston plate for pressing the lock-up clutch installed in a fluid condition such as the torque converter (fluid clutch), thereby reducing an unnecessary loss of power and improving fuel economy.

According to the present invention, the compensation chamber of the piston plate for pressing the lock-up clutch installed in a fluid condition such as the torque converter (fluid clutch) may be separately provided, thereby reducing the pressure of the operation chamber, minimizing an increase in number of components, and simplifying an assembling process.

The specific effects of the present invention, together with the above-mentioned effects, will be described along with the description of specific items for carrying out the present invention.

EXPLANATION OF REFERENCE NUMERALS AND SYMBOLS

1: Housing
9: Spring damper (torsional damper)
10: Input member
102: Spline

104: First flow path hole
12: Input plate
122: Second flow path hole
20: Engine clutch
21: Second piston plate
22: Second clutch pack
24: Second compensation chamber
25: Second operation chamber
26: Second return spring
27: Second guide cylinder
40: Motor
41: Stator
42: Rotor
43: Rotor hub
44: Rotor holder
45: Hub plate
450: Central axis extension portion
452: Axial extension portion
451: First circulation flow path hole
457: First compensation hole
458: First operation hole
459: Lock-up input member
46: Hub ridge
460: Hub coupling portion
461: Second operation hole
462: Second compensation hole
464: Piston installation portion
50: Torque converter (fluid clutch)
51: Impeller
52: Back cover
522: Pump drive hub
54: Turbine
55: Turbine plate
56: Reactor
57: One-way clutch
60: Lock-up clutch
61: First piston plate
62: First clutch pack
632: First guide cylinder
633: Support cylinder
64: Lock-up output member
65: First return spring
66: First operation chamber
67: First compensation chamber
70: Output member
71: Second circulation flow path hole
75: Fixed end
S1: Sealing member
B1, B2, B3, B4, B5: Bearing
A1: First flow path
A2: Second flow path
A3: Third flow path
A4: Fourth flow path
R1: First accommodation space
R2: Second accommodation space

BEST MODE

Hereinafter, exemplary embodiments of the present invention will be described in detail with reference to the accompanying drawings.

The present invention is not limited to the embodiments disclosed herein, but will be variously changed and implemented in various different forms. The embodiments are provided so that the present invention will be thorough and complete, and also to provide a more complete understanding of the scope of the present invention to those of ordinary skill in the art. Therefore, it should be understood that the present invention is not limited to the embodiments disclosed below, but the configuration of any one embodiment and the configuration of another embodiment can be substituted or added, and the present invention includes all alterations, equivalents, and alternatives that are included in the technical spirit and scope of the present invention.

It should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention. In the drawings, sizes or thicknesses of constituent elements may be exaggerated, increased, or decreased for convenience of understanding, but the protection scope of the present invention should not be restrictively construed.

The terms used in the present specification are used only for the purpose of describing particular examples or embodiments and are not intended to limit the present invention. Further, singular expressions include plural expressions unless clearly described as different meanings in the context. In the present application, the terms "comprises," "comprising," "includes," "including," "containing," "has," "having", and other variations thereof are inclusive and therefore specify the presence of features, integers, steps, operations, elements, components, and/or combinations thereof disclosed in the specification. That is, in the present application, the terms "comprises," "comprising," "includes," "including," "containing," "has," "having", and other variations thereof do not preclude the presence or addition of one or more other features, integers, steps, operations, elements, components, and/or combinations thereof.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

When one constituent element is described as being "disposed above" or "disposed below" another constituent element, it should be understood that one constituent element can be disposed directly on another constituent element, and an intervening constituent element can also be present between the constituent elements.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Because a hybrid drive module according to an embodiment is symmetrical with respect to an axis, only the half of the hybrid drive module based on the axis is illustrated for the convenience of illustration. In addition, for the convenience of description, a direction along a longitudinal direction of an axis defining a center of a rotation of the hybrid drive module is defined as an axial direction. That is, a forward/backward direction or an axial direction is defined as a direction parallel to a rotation axis. A front (forward) means any one direction of a power source, e.g., a direction toward an engine. A rear (backward) means the other direction, e.g., a direction toward a transmission. Therefore, a front surface means a surface facing forward, and a rear surface means a surface facing backward.

A radial direction means a direction toward or away from a center of the rotation axis along a straight line passing through the center of the rotation axis on the plane perpendicular to the rotation axis. A direction radially away from the center is referred to as a centrifugal direction, and a direction toward the center is referred to as a centripetal direction.

A peripheral direction or a circumferential direction means a direction surrounding a periphery of the rotation axis. An outer periphery means an outer circumference, and an inner periphery means an inner circumference. Therefore, an outer peripheral surface is a surface facing away from the rotation axis, and an inner peripheral surface is a surface facing the rotation axis.

A circumferential surface means a surface, a normal line of which is directed in a circumferential direction.

A hybrid drive module of the present invention is disposed between an engine and a transmission of a power system.

Figure 1:
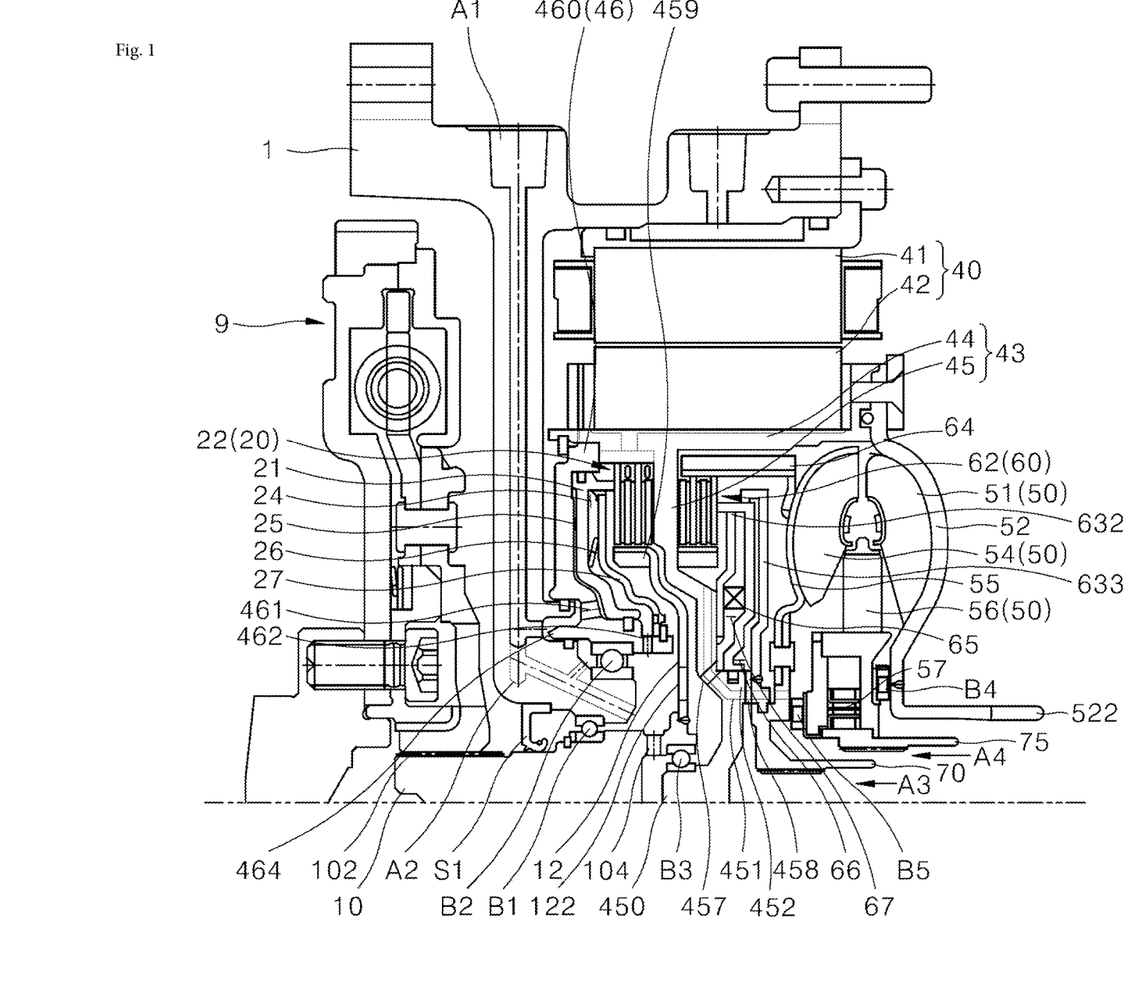
FIG. 1 is a conceptual view of an embodiment of a hybrid drive module according to the present invention.

The hybrid drive module includes a motor 40 configured to provide power to a transmission. The motor 40 may include a stator 41 and a rotor 42.

The stator 41 is fixed to a housing 1 of the hybrid drive module. Further, the rotor 42 is accommodated in the housing 1 at a side positioned radially inward of the stator 41. The rotor 42 may be fixed to a rotor hub 43 disposed in the housing 1.

An input member 10 is provided at a front center of the housing 1 and connected to an engine to receive power of the engine. The input member 10 is supported to be rotatable relative to the housing 1 by means of a first bearing B1.

The input member 10 further protrudes forward than the housing 1, and a spline 102 is formed on an outer peripheral surface of the protruding portion. A torsional damper 9 is connected to the spline 102. An input side of the torsional damper 9 is connected to the engine, and an output side of the torsional damper 9 is connected to the input member 10.

A sealing member S1 is disposed forward of the first bearing B1 and interposed between an inner peripheral surface of the housing 1 and an outer peripheral surface of the input member 10. That is, a space, which is filled with a fluid supplied from the transmission, is disposed rearward of the sealing member S1, and the sealing member S1 and the housing 1 define a boundary of the space filled with the fluid. That is, the torsional damper 9 may be a dry spring damper.

The rotor hub 43 may include a rotor holder 44 configured to fix the rotor 42, and a hub plate 45 extending radially inward from the rotor holder 44. The rotor holder 44 has a shape similar to a cylinder extending in an axial direction.

The hub plate 45 is connected to an approximately central portion in the axial direction of the rotor holder 44.

A central axis extension portion 450, which extends in the axial direction, is provided at a radial inner end of the hub plate 45. The central axis extension portion 450 is disposed rearward of the input member 10 in the axial direction. A partial section in the axial direction of the central axis extension portion 450 overlaps the input member 10. A third bearing B3 is interposed in a section in which the input member 10 and the central axis extension portion 450 overlap each other. The third bearing B3 supports the input member 10 and the central axis extension portion 450 so that the input member 10 and the central axis extension portion 450 rotate relative to each other.

A hub ridge 46 is connected to a front end of the rotor holder 44. The hub ridge 46 is fitted with the rotor holder 44 in a way that the hub ridge 46 is accommodated in the radial internal space of the rotor holder 44 from a location disposed forward of the rotor holder 44. In this case, a hub coupling portion 460 provided at a radial outer end of the hub ridge 46 may engage with the rotor holder 44 to restrict a rotation. In addition, a snap ring is fitted with the rotor holder 44 to prevent the hub ridge 46 from separating from the rotor holder 44.

A piston installation portion 464, which extends rearward, is provided at the radial inner end of the hub ridge 46, and a radial inner end of the housing 1 also extends rearward at a side positioned radially inward of the hub ridge 46. A second bearing B2 is interposed between these components. That is, the hub ridge 46 is rotatably supported on the housing 1.

The rotor hub 43 is rotatably supported on the housing 1 by means of the second bearing B2 and rotatably supported on the housing 1 by means of the third bearing B3, the input member 10, and the first bearing B1.

A back cover 52 is connected to a rear end of the rotor holder 44. The back cover 52 is integrally fixed to a rear end of the rotor holder 44 by means of a fastening means such as a bolt.

A radial internal space of the rotor holder 44 of the rotor hub 43 defines a space filled with a fluid such as transmission oil. The space may be divided into a first accommodation space R1 and a second accommodation space R2 by the hub plate 45. The first accommodation space R1 may be defined as a space between the hub plate 45 and the back cover 52 in the axial direction. The second accommodation space R2 may be defined as space between the hub ridge 46 and the hub plate 45 in the axial direction. That is, the second accommodation space R2 is disposed forward of the first accommodation space R1.

The input member 10 is disposed at a side of the second accommodation space R2. The input member 10 and the rotor hub 43 are connected through an engine clutch 20. The engine clutch 20 is also disposed in the second accommodation space R2. The engine clutch 20 has a second clutch pack 22 in which a plurality of friction plates is disposed in the axial direction.

A radial outer side of the second clutch pack 22 is fixed to an inner peripheral surface of the rotor holder 44 of the rotor hub 43, and a radial inner side of the second clutch pack 22 is fixed to an input plate 12 extending from a rear end to a radial outer side of the input member 10.

A second piston plate 21 is disposed forward of the second clutch pack 22. The second piston plate 21 is disposed between the hub ridge 46 and the second clutch pack 22 in the axial direction. An outer peripheral surface of the second piston plate 21 slidably adjoins the hub ridge 46, and an inner peripheral surface of the second piston plate 21 also slidably adjoins the hub ridge 46. A space between the second piston plate 21 and the hub ridge 46 defines a second operation chamber 25.

The hub ridge 46 has a second operation hole 461 connected to communicate with the second operation chamber 25.

A second guide cylinder 27 is disposed forward of the second clutch pack 22 and rearward of the second piston plate 21. An outer peripheral surface of the second guide cylinder 27 adjoins the second piston plate 21. A radial inner end of the second guide cylinder 27 is fixed to the hub ridge 46. Therefore, the second piston plate 21 slidably adjoins the second guide cylinder 27. A space between the second piston plate 21 and the second guide cylinder 27 defines a second compensation chamber 24. A second return spring 26 is accommodated in the second compensation chamber 24. The second return spring 26 is interposed between the second piston plate 21 and the second guide cylinder 27 and elastically presses the second piston plate 21 in a direction in which the second piston plate 21 moves away from the second guide cylinder 27. That is, the second return spring 26 is elastically biased in a direction in which the second piston plate 21 releases the second clutch pack 22.

The hub ridge 46 has a second compensation hole 462 connected to communicate with the second compensation chamber 24.

Figure 3:
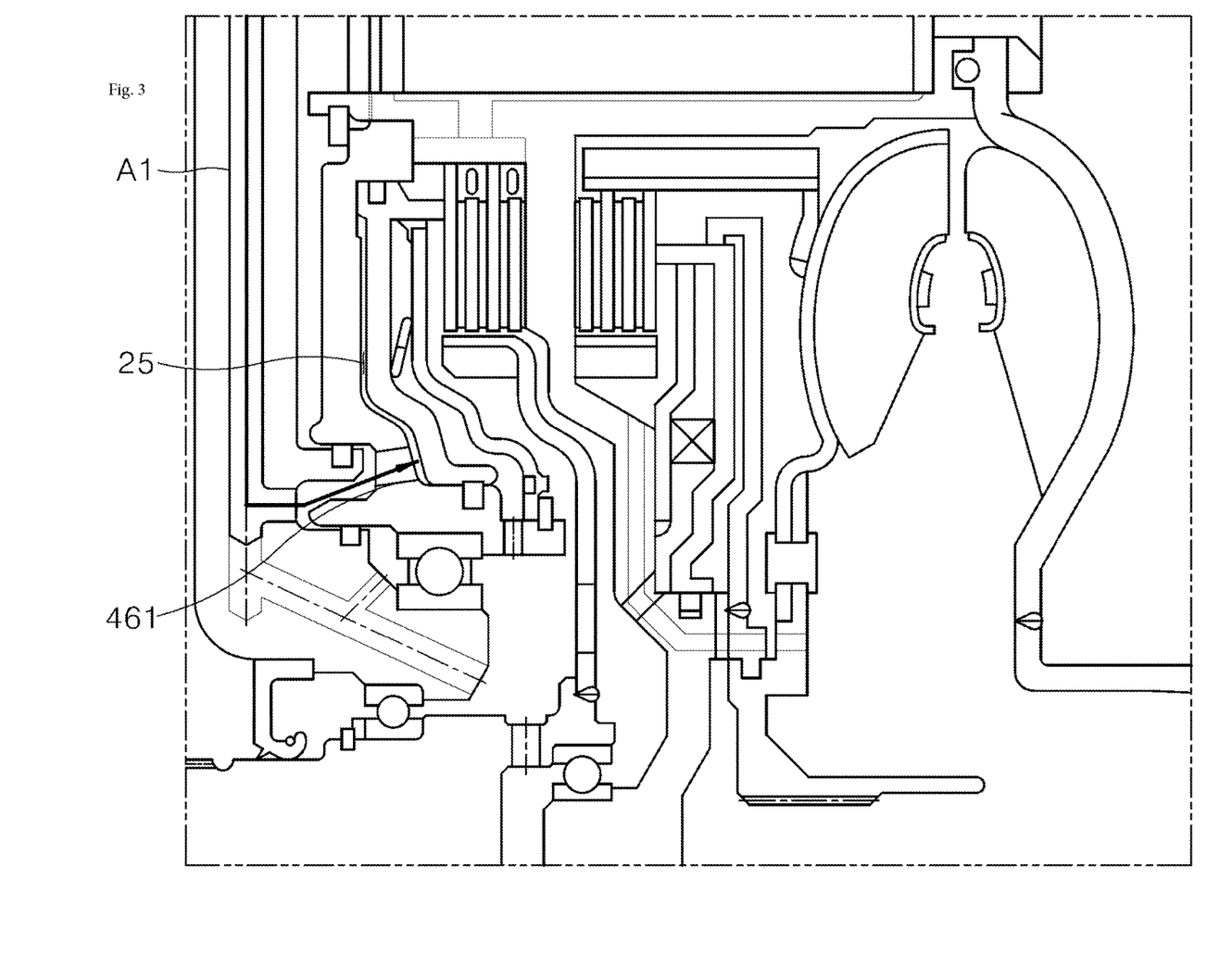
FIG. 3 is an enlarged view of FIG. 1 that illustrates a fluid supply path for a second operation chamber of a second piston plate for operating an engine clutch.

The housing 1 has a first flow path A1 that communicates with the second operation hole 461. That is, as illustrated in FIG. 3, the fluid to be supplied to the second operation chamber 25 is supplied to the second operation chamber 25 through the first flow path A1 and the second operation hole 461.

Figure 2:
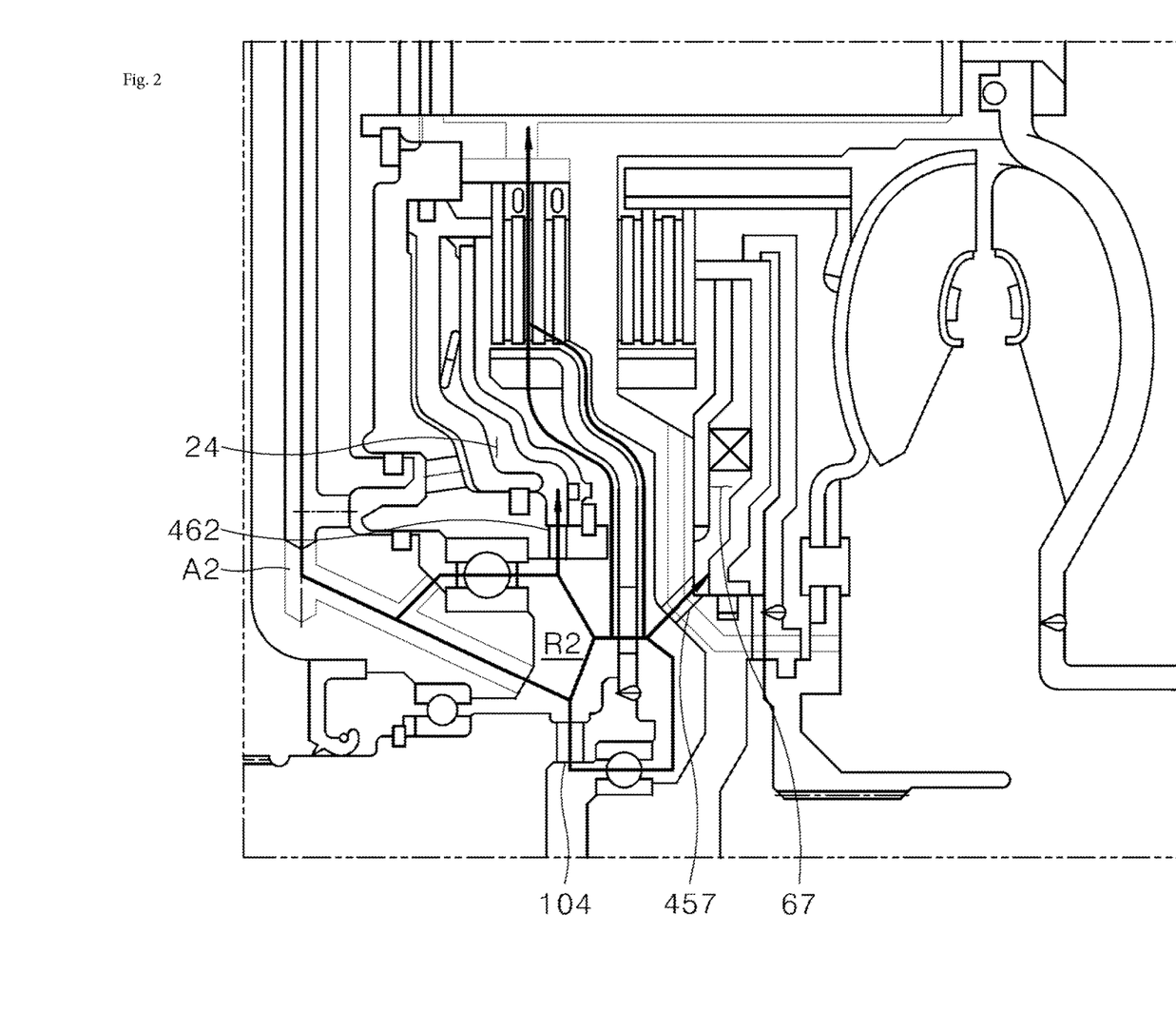
FIG. 2 is an enlarged view of FIG. 1 that illustrates a supply path of a cooling fluid of an engine clutch and a fluid supply path for a first compensation chamber of a first piston plate for operating a lock-up clutch.

The housing 1 has a second flow path A2 that communicates with the second accommodation space R2. Further, the second compensation hole 462 communicates with the second accommodation space R2. Therefore, as illustrated in FIG. 2, the fluid to be supplied to the second compensation chamber 24 is supplied to the second compensation chamber 24 through the second flow path A2, the second accommodation space R2, and the second compensation hole 462.

In the housing 1, the first flow path A1 and the second flow path A2 do not communicate with each other.

In the second accommodation space R2, the first bearing B1, the second bearing B2, and the third bearing B3 are disposed, and the second clutch pack 22 is also disposed. A first flow path hole 104 and a second flow path hole 122 may be respectively formed in the input member 10 and the input plate 12 so that the fluid, which is stored in the second accommodation space R2, smoothly flows through the second flow path A2. Therefore, as illustrated in FIG. 2, the fluid supplied through the second flow path A2 fills the second accommodation space R2 and lubricates and cools the bearings B1, B2, and B3 and the second clutch pack 22. That is, it can be seen that the second clutch pack 22 is a wet clutch.

When the pressure of the fluid supplied through the first flow path A1 overcomes the pressure of the fluid supplied through the second flow path A2 and the elastic force of the second return spring 26, the second piston plate 21 presses the second clutch pack 22. Otherwise, the second piston plate 21 releases the second clutch pack 22.

A power transmission part may be accommodated in a first accommodation space of the rotor hub 43.

The power transmission part may include a fluid clutch 50 connected to the rotor hub 43, and a first clutch pack 62 connected to the rotor hub 43.

The fluid clutch 50 may be a torque converter. That is, the fluid clutch may include an impeller 51 and a turbine 54 facing each other and having a half toms shape, and a reactor 56 disposed between the impeller 51 and the turbine 54 and connected to a fixed end 75 through a one-way clutch 57.

The impeller 51 may be provided on the back cover 52. Therefore, the rotation of the impeller 51 relative to the rotor hub 43 is restricted.

A pump drive hub 522 is provided at a radial inner side of the back cover 52 and extends rearward. When the rotor hub 43 rotates, a rotational force of the rotor hub 43 operates the pump by means of the back cover 52 and the pump drive hub 522. Therefore, the transmission oil is supplied to the first accommodation space R1. Therefore, the first accommodation space R1 is filled with the fluid for operating the fluid clutch 50 and cooling the first clutch pack 62.

The turbine 54 is disposed forward of the impeller 51 while facing the impeller 51. A radial inner side of a turbine plate 55, on which the turbine 54 is installed, is connected to an output member 70. The output member 70 is connected to an input side of the transmission.

The reactor 56 is disposed between the impeller 51 and the turbine 54. The reactor 56 is installed at the fixed end 75 by means of the one-way clutch 57. The reactor 56 rotates relative to the back cover 52 and rotates relative to the output member 70. A fourth bearing B4 is interposed between the reactor 56 and the back cover 52 and a fifth bearing B5 is interposed between the reactor 56 and the output member 70 in order to allow and support the relative rotation between the back cover 52 and the reactor 56 and the relative rotation between the output member 70 and the reactor 56. That is, the output member 70 and the back cover 52 are rotatably supported on the fixed end 75.

In the second accommodation space R2, a lock-up clutch 60 is disposed forward of the turbine plate 55. The lock-up clutch 60 has a first clutch pack 62 in which a plurality of friction plates is disposed in the axial direction.

The first clutch pack 62 is disposed between the rotor hub 43 and the output member 70 and connects or disconnects the rotor hub 43 and the output member 70.

A radial inner side of the first clutch pack 62 is connected to the rotor hub 43. Specifically, a lock-up input member 459 is provided at a radial inner side of the first clutch pack 62, and the lock-up input member 459 is connected to the hub plate 45 of the rotor hub 43.

A radial outer side of the first clutch pack 62 is connected to the output member 70. Specifically, a lock-up output member 64 having a drum shape is provided at the radial outer side of the first clutch pack 62, and the lock-up input member 459 is fixed to the turbine plate 55 connected to the output member 70.

That is, an input side of the first clutch pack 62 is disposed at a radial inner side thereof, and an output side of the first clutch pack 62 is disposed at a radial outer side thereof.

A first piston plate 61 configured to press or release the first clutch pack 62 is installed in the first accommodation space R1.

The first piston plate 61 has a shape extending in the radial direction and has a first surface directed toward any one side in the axial direction, and a second surface directed toward a side opposite to one side. That is, the first surface and the second surface are opposite to (face away from) each other.

The first surface is disposed to face the hub plate 45 and disposed to face the first clutch pack 62. Further, the second surface is disposed to be directed toward the torque converter.

A radial inner end of the first piston plate 61 faces and adjoins, in the radial direction, an outer peripheral surface of an axial extension portion 452 that is a portion in which the hub plate 45 extends rearward in the axial direction between the rotor holder 44 and the central axis extension portion 450. A radial inner end of the first piston plate 61 slidably adjoins a portion thereof that faces the hub plate 45.

A first guide cylinder 632 is disposed forward of the first piston plate 61. The first guide cylinder 632 is disposed between the first piston plate 61 and the first clutch pack 62. A radial inner end of the first guide cylinder 632 is fixed to the hub plate 45 of the rotor hub 43, and a radial outer end of the first guide cylinder 632 adjoins the first piston plate 61. The radial inner end of the first guide cylinder 632 is connected to the rotor hub 43 at a side positioned radially inward of the first clutch pack 62. The first piston plate 61 slidably adjoins a radial outer end of the first guide cylinder 632.

The first guide cylinder 632 and the first piston plate 61 define a first compensation chamber 67 for the first piston plate 61. The first surface of the first piston plate 61 faces the first compensation chamber 67.

A first return spring 65 is installed in the first compensation chamber 67. The first return spring 65 is interposed between the first guide cylinder 632 and the first piston plate and elastically presses the first piston plate 61 in a direction in which the first piston plate 61 moves away from the first guide cylinder 632. That is, the first return spring 65 elastically biases the first piston plate 61 in a direction in which the first piston plate 61 presses or releases the first clutch pack 62.

A support cylinder 633 is disposed rearward of the first piston plate 61. A radial inner end of the support cylinder 633 is fixed to the hub plate 45 of the rotor hub 43 at a side positioned radially inward of the first clutch pack 62. Further, a radial outer end of the first piston plate 61 slidably adjoins the support cylinder 633.

The support cylinder 633 and the first piston plate 61 define a first operation chamber 66 for the first piston plate 61. The second surface of the first piston plate 61 faces the first operation chamber 66.

A first compensation hole 457 is formed in the hub plate 45 and disposed between the portion where the hub plate 45 is connected to the first guide cylinder 632 and the portion where the hub plate 45 adjoins the first piston plate 61. Further, the first compensation hole 457 is formed such that the first compensation chamber 67 and the second accommodation space R2 communicate with each other. Therefore, as illustrated in FIG. 2, the fluid, which fills the second accommodation space R2 through the second flow path A2, may be introduced into the first compensation chamber 67.

A first operation hole 458 is formed in the hub plate 45 and disposed between the portion where the hub plate 45 adjoins the first piston plate 61 and the portion where the hub plate 45 is connected to the support cylinder 633.

The output member 70 has a hollow shaft shape. Further, a spline is formed on an inner peripheral surface of the hollow shaft shape and connected to the input side of the transmission. The hollow portion of the output member 70 defines a third flow path A3 through which the fluid is supplied to the first operation chamber 66.

The axial extension portion 452 of the hub plate 45 adjoins the output member 70 so that the axial extension portion 452 may rotate relative to the output member 70. An inner peripheral surface of the rear end of the axial extension portion 452 adjoins the output member 70 with a sealing member interposed therebetween.

Figure 4:
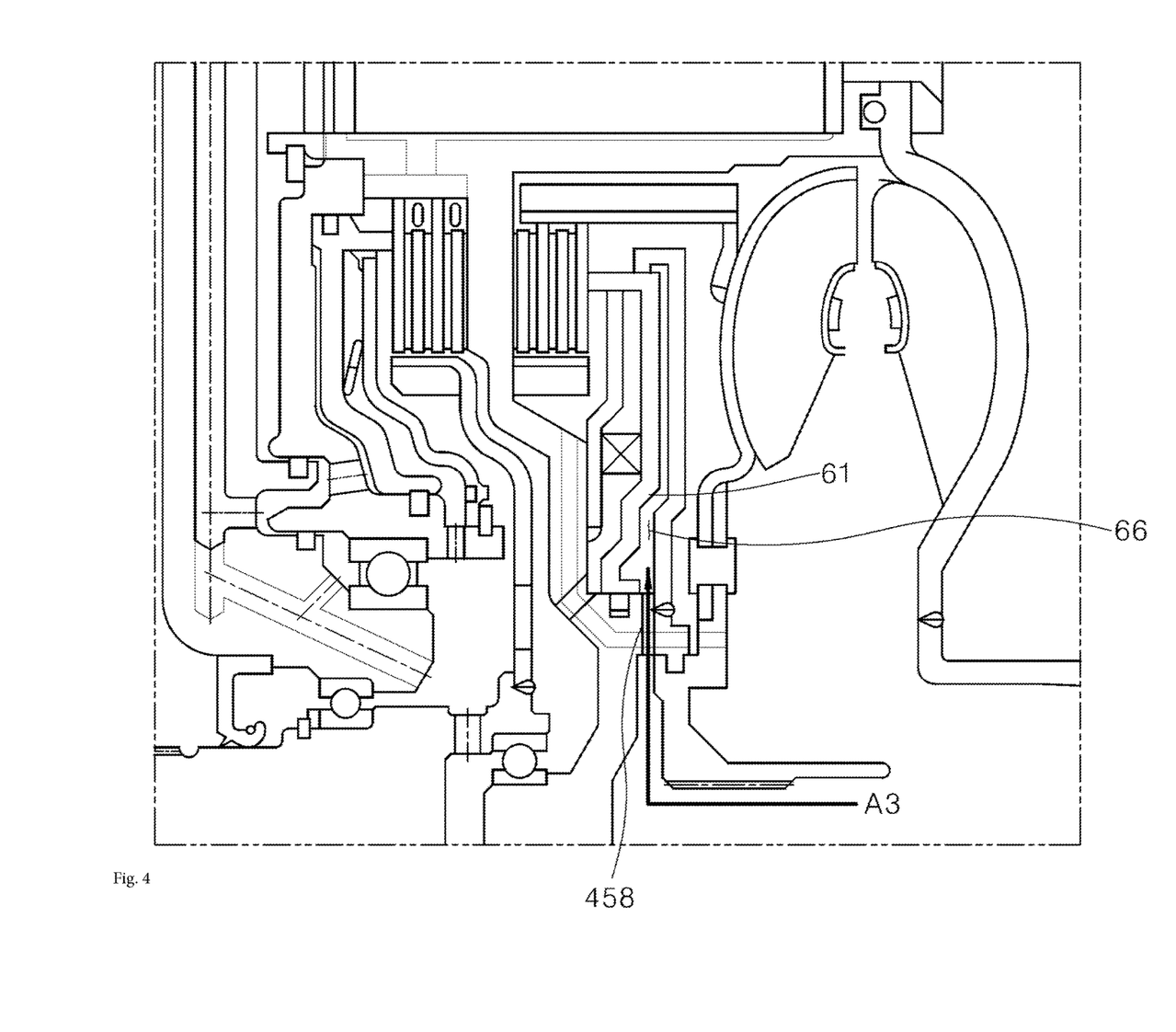
FIG. 4 is an enlarged view of FIG. 1 that illustrates the fluid supply path for the first operation chamber of the first piston plate for operating the lock-up clutch.

The first operation hole 458 is formed such that the first operation chamber 66 and the hollow portion of the output member 70 communicate with each other. Therefore, as illustrated in FIG. 4, the transmission oil supplied through the third flow path A3 may be introduced into the first operation chamber 66 through the first operation hole 458.

Meanwhile, a space of the first accommodation space R1, in which oil flows to supply the fluid to the torque converter, may be divided into a first space between the hub plate 45 and the first guide cylinder 632, a second space between the support cylinder 633 and the turbine plate 55, and a third space disposed in the torus.

Further, a first circulation flow path hole 451 is formed in the hub plate 45 and connected so that the first space and the second space communicate with each other. In addition, a second circulation flow path hole 71 is formed in the output member 70 and connected so that the second space and the third space communicate with each other.

A space between the fixed end 75 and the output member 70 may define a fourth flow path A4 for supplying the fluid from the transmission to the torque converter.

Figure 5:
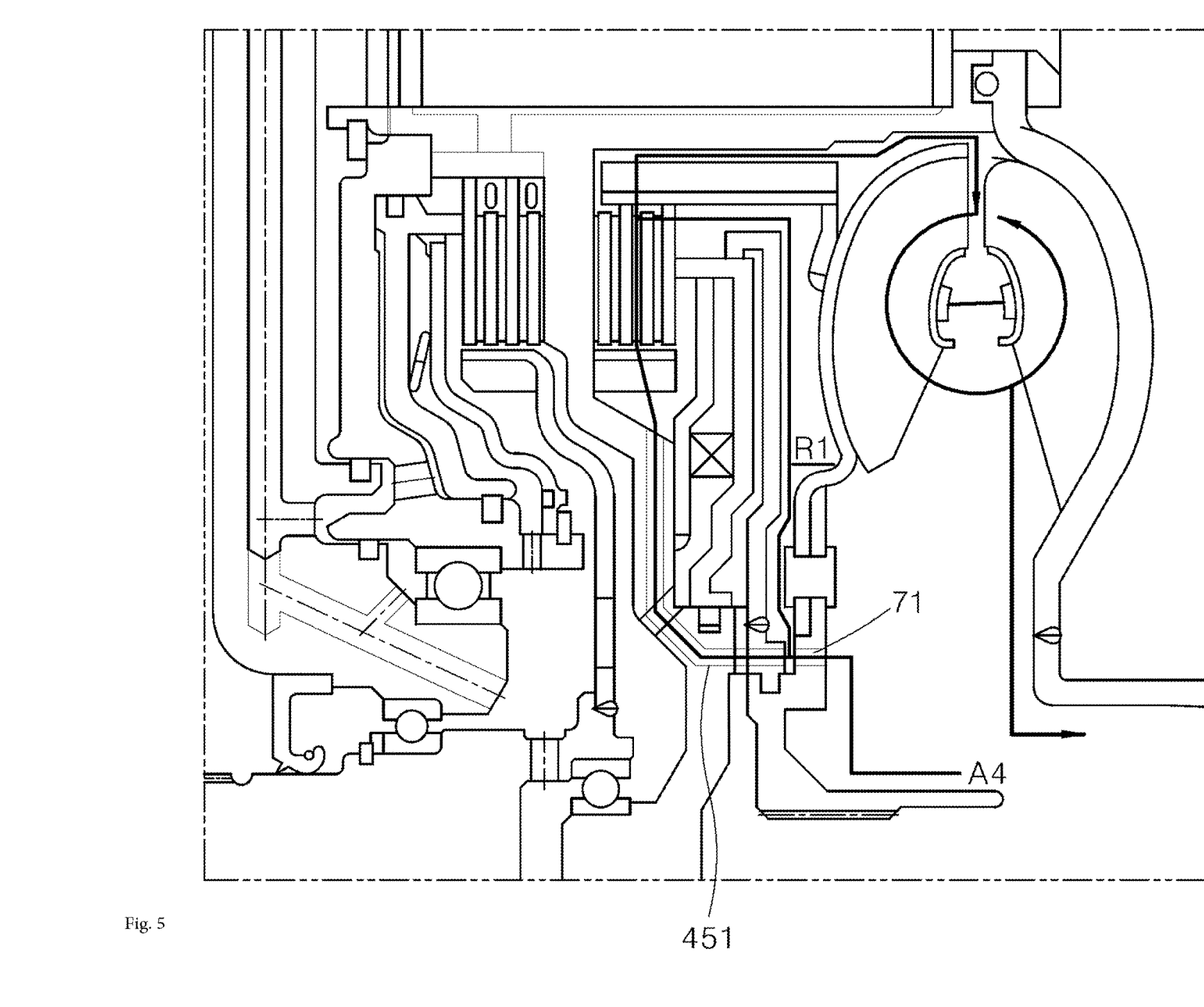
FIG. 5 is an enlarged view of FIG. 1 that illustrates the fluid supply path for cooling the lock-up clutch and operating a torque converter.

As illustrated in FIG. 5, when the fluid is supplied through the fourth flow path A4, the fluid may flow to the second space through the second circulation flow path hole 71 of the output member 70 and flow from the second space in a centrifugal direction. In addition, a part of the fluid, which has flown to the second space through the second circulation flow path hole 71, may flow to the first space through the first circulation flow path hole 451 and flow from the first space in the centrifugal direction.

The fluid, which has flown from the first space and the second space in the centrifugal direction, may be introduced into a third space at a radial outer side of the torus. Although not illustrated, a part of the fluid supplied through the fourth flow path may, of course, be introduced directly to the third space through the space between the output member 70 and the reactor 56.

The oil introduced into the third space may be discharged to the transmission through the space between the reactor 56 and the back cover 52.

During the circulation process of the fluid, the first clutch pack 62, the one-way clutch 57, the fourth bearing B4, and the fifth bearing B5 may be lubricated and cooled.

The pressure of the fluid stored in the first accommodation space R1 is maintained as high pressure because of the characteristics of the torque converter. In contrast, the pressure of the fluid stored in the first compensation chamber 67 just corresponds to the pressure of the fluid stored in the second accommodation space R2. The fluid stored in the second accommodation space R2 has the pressure that generates a flow of fluid that cools or lubricates the bearings B1, B2, and B3 and the second clutch pack 22.

Therefore, the first surface of the first piston plate 61 faces the first compensation chamber 67 filled with the fluid with the pressure lower than the pressure of the fluid in the first accommodation space R1. Further, the second surface faces the first operation chamber 66 filled with the fluid with the pressure for moving the first piston plate 61 to the first clutch pack 62.

Therefore, according to the present invention, it is possible to further reduce operating pressure for operating the first piston plate 61 in comparison with a structure in which the first compensation chamber 67 is not present. That is, the presence of the first compensation chamber 67 may further increase the pressure of the first piston plate 61 applied to the first clutch pack 62 even in a case in which the pressure of the fluid stored in the first operation chamber 66 is further lowered.

In addition, according to the present invention, it is not necessary to configure a separate oil flow path or add a separate component to configure the first compensation chamber 67 and fill the first compensation chamber 67 with oil. Further, it is possible to fill the first compensation chamber 67 with the oil in the second accommodation space R2 only by simply forming the first compensation hole 457 in the hub plate 45 that defines the boundary with the first compensation chamber 67.

As described above, the rotor hub 43 is connected to the first clutch pack 62 at the radial inner side of the first clutch pack 62, and the output member 70 is connected to the first clutch pack 62 at the radial outer side of the first clutch pack 62. This may more simply configure the structures of and methods of assembling the first compensation chamber 67, the first operation chamber 66, and the first piston plate 61 in the structure according to the present invention in which the first piston plate 61 is disposed rearward of the first clutch pack 62 from the hub plate 45.

While the present invention has been described above with reference to the accompanying drawings, the present invention is not limited to the drawings and the embodiments disclosed in the present specification, and it is apparent that the present invention may be variously changed by those skilled in the art without departing from the technical spirit of the present invention. Further, even though the operational effects of the configurations of the present invention have not been explicitly disclosed and described in the description of the embodiment of the present invention, the effects, which can be expected by the corresponding configurations, should, of course, be acceptable.

The invention claimed is:

1. A hybrid drive module, which is disposed between an engine and a transmission of a power system and includes a motor configured to provide power to the transmission, the hybrid drive module comprising:
   a rotor hub on which a rotor of the motor is installed, the rotor hub dividing an internal space of the hybrid drive module into a first accommodation space and a second accommodation space in an axial direction;
   a fluid clutch and a first clutch pack connected to the rotor hub respectfully and accommodated in the first accommodation space, the first accommodation space configured to allow a first fluid for operating the fluid clutch and cooling the first clutch pack to flow and fill the first accommodation space;
   a first piston plate installed in the first accommodation space and configured to press or release the first clutch pack;
   a first operation chamber installed in the first accommodation space and filled with a second fluid that generates pressure for moving the first piston plate toward the first clutch pack; and
   a first compensation chamber installed in the first accommodation space and filled with a third fluid in the second accommodation space with pressure lower than pressure of the first fluid in the first accommodation space through the rotor hub,
   wherein the first piston plate has a first surface directed toward the first clutch pack in the axial direction and facing the first compensation chamber, and a second surface opposite to the first surface in the axial direction and facing the first operation chamber,
   wherein the first piston plate is disposed between the rotor hub and the first operation chamber in the axial direction, and
   wherein the first operation chamber is defined by the second surface and a support cylinder disposed to face the second surface in the axial direction and connected to the rotor hub.

2. The hybrid drive module of claim 1, wherein the rotor hub has a rotor holder to which the rotor is fixed, and a hub plate extending from the rotor holder to a radial inner side,
   wherein the hub plate divides the internal space of the hybrid drive module into the first accommodation space and the second accommodation space in the axial direction, and
   wherein the first piston plate is disposed so that the first surface faces the hub plate.

3. The hybrid drive module of claim 2, wherein a second clutch pack is accommodated in the second accommodation space,
   wherein the third fluid fills the second accommodation space and flows for cooling the second clutch pack.

4. The hybrid drive module of claim 3, wherein a second piston plate configured to press or release the second clutch pack is installed in the second accommodation space,
   wherein the second piston plate has a third surface facing the second clutch pack in the axial direction, and a fourth surface opposite to the third surface in the axial direction,
   wherein the fourth surface faces a second operation chamber filled with a fourth fluid that generates pressure for moving the second piston plate toward the second clutch pack, and
   wherein the third surface faces a second compensation chamber filled with the third fluid in the second accommodation space.

5. The hybrid drive module of claim 4, wherein a hub ridge is connected to a front side of the rotor holder,
   wherein the second piston plate is installed on the hub ridge so as to be slidable in the axial direction, and
   wherein the hub ridge and the fourth surface define the second operation chamber.

6. The hybrid drive module of claim 5, wherein a second guide cylinder is connected to the hub ridge,
   wherein the second piston plate is disposed between the hub ridge and the second guide cylinder in the axial direction, and
   wherein the third surface and the second guide cylinder define the second compensation chamber.

7. The hybrid drive module of claim 1, wherein the first compensation chamber is disposed between the rotor hub and the first piston plate in the axial direction.

8. The hybrid drive module of claim 7, wherein the first compensation chamber is defined by the first surface and a first guide cylinder disposed to face the first surface in the axial direction, and
   wherein the first guide cylinder is connected to the rotor hub.

9. The hybrid drive module of claim 8, wherein the first piston plate is disposed between the rotor hub and the first operation chamber in the axial direction,
   wherein the first operation chamber is defined by the second surface and a support cylinder disposed to face the second surface in the axial direction, and
   wherein a radial inner end of the support cylinder is connected to the rotor hub at a side positioned radially inward of the first clutch pack.

10. The hybrid drive module of claim 1, wherein a radial inner end of the support cylinder is connected to the rotor hub at a side positioned radially inward of the first clutch pack.

11. The hybrid drive module of claim 1, wherein the rotor hub is connected to the first clutch pack at a radial inner side of the first clutch pack.

12. The hybrid drive module of claim 11, wherein the hybrid drive module has an output member configured to transmit an output of the motor or the engine to the transmission, and wherein the output member is connected to the first clutch pack at a radial outer side of the first clutch pack.

13. The hybrid drive module of claim 12, wherein the fluid clutch includes an impeller connected to the rotor hub and a turbine connected to the out put output member, and the output member is connected to the first clutch pack through the turbine.

14. The hybrid drive module of claim 13, wherein the fluid clutch further includes a reactor disposed between the impeller and the turbine to be a torque converter.

\* \* \* \* \*